United States Patent [19]

Boesing et al.

[11] Patent Number: 4,469,133
[45] Date of Patent: Sep. 4, 1984

[54] ENGINE COOLANT FLOW CONTROLLING VALVE

[75] Inventors: Hans Boesing, Oftersheim; Dieter Gabler, Graben-Neudorf, both of Fed. Rep. of Germany

[73] Assignee: Ranco Incorporated, Dublin, Ohio

[21] Appl. No.: 555,459

[22] PCT Filed: Apr. 6, 1982

[86] PCT No.: PCT/US82/00422
§ 371 Date: Nov. 14, 1983
§ 102(e) Date: Nov. 14, 1983

[87] PCT Pub. No.: WO83/03652
PCT Pub. Date: Oct. 27, 1983

[51] Int. Cl.³ .............................................. F16K 11/06
[52] U.S. Cl. .......................... 137/625.29; 137/625.48; 137/872
[58] Field of Search ....................... 137/625.29, 625.48, 137/872; 251/231, 174

[56] References Cited

U.S. PATENT DOCUMENTS

| 1,707,692 | 4/1929 | Ter Beest | 137/625.29 |
| 2,828,767 | 4/1958 | Barusch | 137/625.29 |
| 3,132,669 | 5/1964 | Feldsted | 137/625.48 |
| 3,462,244 | 8/1969 | Leisey | 137/625.48 X |
| 3,788,354 | 1/1974 | Symmons | 137/625.48 X |

Primary Examiner—Arnold Rosenthal
Attorney, Agent, or Firm—Watts, Hoffmann, Fisher & Heinke

[57] ABSTRACT

An engine coolant flow controlling valve for governing the flow of engine coolant to a heater core comprises a valve housing defining first and second ports for respectively introducing coolant to the valve housing from the engine and directing coolant to the engine from the housing, said first and second ports opening into said housing adjacent each other in a housing wall, and third and fourth ports for respectively directing coolant from the housing to the heater core and introducing coolant from the heater core to the housing; a ceramic valving member supported for translational movement in the housing between a first position wherein coolant flows to said heater core via the first and third ports and returns to the engine via the second and fourth ports and a second position wherein the valving member blocks flow through the third and fourth ports and coolant flows from the first port to the second port bypassing said heater core. A valving member operator assembly extends into the housing for moving the valving member; and a valving member engaging assembly for resiliently maintaining the valving member in sealing engagement with the housing; the engaging assembly surrounding each of the third and fourth ports in sealing relationship with the housing and sealingly engaged with said valving member at least when the valving member is in its second position.

5 Claims, 2 Drawing Figures

ENGINE COOLANT FLOW CONTROLLING VALVE

TECHNICAL FIELD

The present invention relates to valves for controlling engine coolant flow to heat exchangers in automotive vehicle heating systems and more particularly to coolant control valves constructed to bypass engine coolant around the heat exchanger while controlling the flow.

BACKGROUND ART

Automotive vehicles driven by liquid cooled engines generally employ a passenger compartment heating system having a flow tube type heat exchanger (heater core) through which engine coolant flows. Air passing over the heater core is heated and directed into the passenger compartment to warm the compartment. The coolant flow rate through the heater core affects the amount of heat transferred into the passenger compartment. Coolant control valves have been employed for governing the coolant flow through the heater cores to control passenger compartment temperatures.

Liquid cooled automotive vehicle engines generally employ a coolant composed of at least 50% ethylene glycol, or an equivalent compound, and water. Ethylene glycol prevents the coolant from freezing in cold climates, or seasons, and is usually thought of as an "antifreeze" additive; however, ethylene glycol is an extremely effective wetting agent. As such, ethylene glycol greatly increases the ability of engine coolant to gain or lose heat while flowing through engine cooling passages or heat exchanger tubes, even though the heat capacity of ethylene glycol is not as great as that of water. Thus the presence of ethylene glycol in engine cooling systems is desirable regardless of ambient atmospheric temperatures.

Engine coolant systems typically contain abrasive particulate matter which circulates with the coolant. The particulates, together with ethylene glycol, tend to foul coolant flow control valves. Fouled valves can stick, or jam, in a particular position and fail to control the coolant flow in response to passenger compartment temperature. This nearly invariably results in vehicle occupant discomfort and necessitates control valve repair or replacement.

Engine coolant flow control valves have been proposed in which variable proportions of the coolant flowing to the control valve bypasses the heater core. Examples of such valves are disclosed by U.S. Pat. Nos. 3,477,498 and 4,195,777. Valves of the sort disclosed by these patents are of relatively complex construction in that they contain many component parts including multiple valving members and are not easily assembled. Such valves can be relatively expensive to purchase, particularly as replacement parts, and are sometimes subject to being fouled and rendered inoperative by materials in the engine coolant flowing through them. In addition the pressure drop of the coolant flowing through the valve can change substantially between the heating condition and the bypass condition.

DISCLOSURE OF THE INVENTION

The present invention provides a new and improved engine coolant flow controlling valve assembly wherein engine coolant is supplied to a heater core in accordance with positioning a coolant flow controlling valving member between one position where flow to the heater core is maximized and a second position wherein coolant flow bypasses the heater core and communication with the heater core is blocked. The new flow control valve is constructed of a relatively few, simple and easily assembled elements, and resists sticking, jamming or other malfunctions resulting from prolonged exposure to the engine coolant.

In a preferred embodiment the coolant control valve comprises a valve housing, a ceramic valving member translatably movable in the housing between a first position wherein engine coolant flows through the heat exchanger and a second position wherein the valving member bypasses the coolant from the heat exchanger and returns it to the engine, a valving member operator assembly, and a valving member engaging assembly for sealing the valving member. The valve housing defines first and second ports opening into a valving member slide surface by which coolant is supplied to and delivered from the engine, and third and fourth ports by which coolant is supplied to and delivered from the heat exchanger. The valving member provides a sealing land sealingly engaging the slide surface and extending about a recessed face so that in the second valving member position the sealing land surrounds the first and second ports and coolant flows between the first and second ports via the recessed face. A valve port opens into the recessed face and is located to be aligned with the second and fourth ports when the valving member is in its first position. The valving member engaging assembly sealingly surrounds each of the third and fourth ports and seals against the valving member so that when the valving member is in its second position, flow through the valve port and through the third and fourth ports is blocked.

The preferred valving member engaging assembly comprises first and second pressure members respectively surrounding the third and fourth ports and structure for biasing the pressure members against the valving member to urge the valving member into sealing engagement with the valve slide surface.

Other features and advantages of the invention will become apparent from the following detailed description of a preferred embodiment made with reference to the accompanying drawings which form a part of the specification.

DESCRIPTION OF A PREFERRED EMBODIMENT

Figure 1:
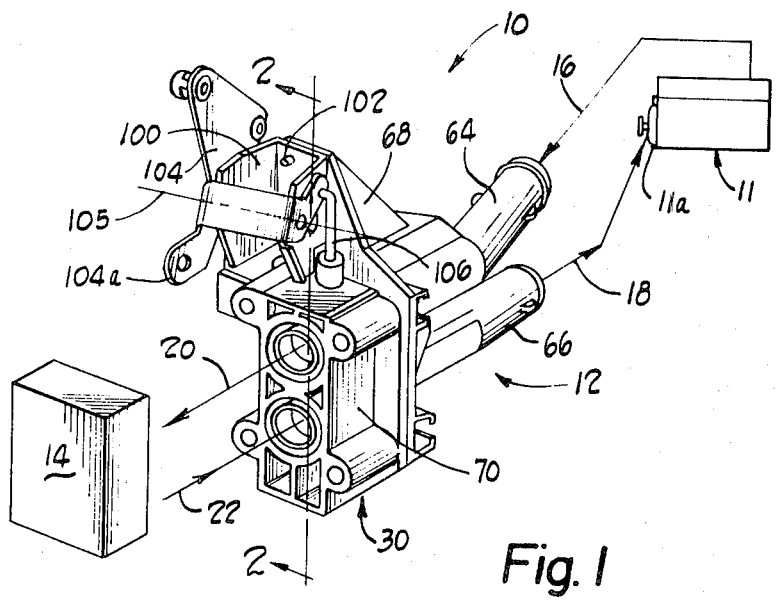
FIG. 1 shows part of a vehicle engine cooling system constructed according to the invention with portions schematically illustrated; and, FIG. 2 is a cross-sectional view seen approximately from the plane indicated by the line 2—2 of FIG. 1.

Part of a vehicle engine coolant system 10 for heating a vehicle passenger compartment is illustrated by FIG. 1 of the drawings. The system 10 is associated with an engine 11 having an engine driven coolant pump 11 for circulating coolant in the coolant system. The illustrated passenger compartment heating system portion includes a coolant flow controlling valve assembly 12 and a heat exchanger 14, schematically illustrated. The heat exchanger 14 is preferably a conventionally constructed heater core of the type typically used in automotive vehicles to heat air which is directed into the passenger compartment for heating the passenger compartment.

The valve assembly 12 is constructed and arranged to control the flow rate of engine coolant through the heater core 14 and thus control the amount of heat transferred into the passenger compartment of the vehicle. The valve assembly 12 is connected to the engine by coolant supply and return lines 16, 18, respectively. The valve assembly 12 is operated to provide a controlled flow of engine coolant to the heater core 14 through a heater core supply line 20. The coolant passing through the heater core 14 is returned to the engine 11 by a heater core return line 22, the valve assembly 12 and the coolant return line 18. The lines 16, 18, 20 and 22 are preferably typical cloth reinforced rubberized coolant hoses and are therefore shown schematically.

The valve assembly 12 comprises a valve housing assembly 30 defining first and second ports 32, 34 associated with the coolant supply and return lines 16, 18, respectively, and third and fourth ports 36, 38 associated with the heater core supply and return lines 20, 22, respectively. The valve assembly 12 also includes a valving member 40 disposed in the housing assembly 30, a valving member operating mechanism 42 associated with the assembly 30 for actuating the valving member 40 between operative positions to control the coolant flow through the assembly 12, and a valving member engaging assembly 44 coacting with the housing assembly 30 and the valving member 40.

The housing assembly 30 comprises molded housing members 50, 52 which are bonded together to define an interior valving chamber 54. The housing members are preferably molded from a glass-filled polyamid thermoplastic material, but other materials can be used.

The housing member 50 is defined by a plate-like body 56 forming a housing wall and a peripheral mounting flange 60 disposed about the housing wall. The housing wall defines a planar valve slide surface 62 along one side of the chamber 54. The first and second coolant ports 32, 34 open into the chamber through the slide surface. The slide surface 62 extends beyond the second port 34 to a well-like chamber section 54a which, in the preferred orientation of the assembly 12, is at its lower-most end. Pipe-like coolant hose connectors 64, 66, molded integrally with the body 56, extend to the lines 16, 18 respectively. The hose connectors 64, 66 are supported with respect to each other and the body 56 by reinforcing webs 68 which also extend to the mounting flange 60.

The housing member 52 forms a peripheral valve chamber wall 70 disposed about the valve chamber 54 and a second wall construction 72 confronting the housing wall formed by the body 56. The wall construction 72 defines the third and fourth ports 36, 38 which are aligned with the first and second ports 32, 34, respectively. The ports 36, 38 are constructed to provide projecting external ends 74, 76 forming hose connections for the lines 20, 22, respectively. The housing member 52 further includes molded-in mounting screw receiving bosses 78 and coacting structures on the mounting flange 60 so that the assembly 12 can be suitably secured in place where desired in the vehicle for example, attached to brackets adjacent the heater core structure itself.

The valving member 40 is a plate-like ceramic element translatably movable in the chamber 54 to meter the coolant flowing through the heater core 14. The side of the valving member facing the slide surface 62 forms a recessed face 82 completely surrounded by a peripheral sealing land 84 extending from the face 82 into sealing engagement with the slide surface 62. A valve port 85 opens in the recessed face 82 and extends through the valving member. The opposite valving member side defines a smooth planar surface 88 engaged by the valving member engaging assembly 44.

Figure 2:
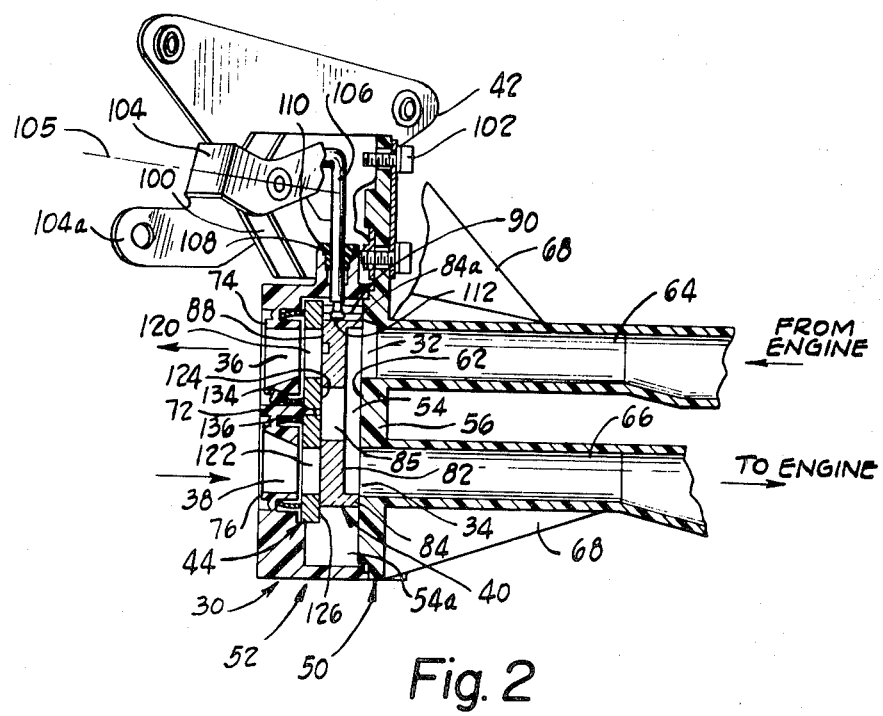

The valving member 40 is shaped and sized so that the land 44 extends about the first and second ports when positioned as illustrated by FIG. 2. In this position of the valving member the coolant flow from the engine bypasses the heater core by flowing through a by-pass passageway formed by the recessed valving member face 82. Thus coolant flowing to the valve assembly 12 through the line 16 is returned to the engine through the line 18 without passing through the heater core 14. The distance the face 82 is recessed in the valving member to produce a pressure drop in the bypassed coolant which is substantially the same as that provided by the heater core 14.

When the valving member 40 is slid fully into the chamber well section 54a, the sealing land section 84a at the upper valving member extremity (as shown by FIG. 2) moves across the first port 32 to entirely block bypass coolant flow since the land 84 is sealed against the valve slide face 62 about the second port 34 and prevents direct communication between the ports 32, 34. The valving member engages the peripheral housing wall 70 at the end of the slide surface 62 to limit the valving member motion. In this position the first and third ports directly communicate with each other as do the second and fourth ports via the valve port 85 thereby assuring full flow of coolant through the heater core 14. When the valving member 40 is positioned between its extremes of movement, part of the coolant delivered to the valve assembly 12 flows through the heater core while the remainder of the coolant supply by-passes the heater core and is returned to the engine.

The valving member land section 84a is provided with an axially extending "T" slot 90 by which the valving member is connected to the operating mechanism 42. The operating mechanism 42 extends into the housing assembly 30 to the valving member 40 for pushing the valving member toward the housing chamber well section 54a to maximize engine coolant flow to the heater core and pulling the valving member away from the chamber well section to prevent flow to the heater core.

The operating mechanism 42 is preferably a lever system having a generally U-shaped sheet metal support base 100 attached by suitable connectors 102 to the housing mounting flange 60; a sheet metal bell crank member 104 pinned to projecting legs of the U-shaped support base 100 for rotation about a pivot axis 105; and an actuating rod 106 pivoted to the bell crank member 104 and connected to the valving member 40.

The rod 106 extends into the chamber 54 through a sealing gland 108 supported in a boss 110 integral with the housing member 52. The projecting end of the rod 106 is provided with a headed knob 112 interfitting with the valving member T-slot 90 to facilitate easy assembly of the rod and valving member yet assure positive motion of the valving member 40 by the rod 106.

The bell crank 104 has an arm portion 104a suitable for connection to the output arm of a pneumatic actuator or a conventional cable-type actuator to enable rotation of the bell crank 104 about the axis 105 and consequent translational actuation of the valving member 40 by the rod 106.

The valving member engaging assembly 44 biases the valving member 40 into sealing engagement with the valve slide face 62 and seals between the valving member and the third and fourth ports. The preferred assembly 44 comprises first and second independent bearing members 120, 122 each having a generally annular body defining a respective sealing face 124, 126 engaging the valve member face 88. The seal faces 124, 126 respectively surround the third and fourth ports. Each bearing member 120, 122 coacts with a respective resilient sealing ring 134, 136 disposed in a sealing ring retaining groove extending concentrically around the associated one of the third and fourth ports. The sealing rings 134, 136 are cylindrical and formed of rubber-like material. When the bearing members are disposed in the housing in contact with the valving member 40 the rings 134, 136 are axially compressed and outwardly bowed to both seal against the ring grooves and the bearing members and to bias the bearing members against the valving member. The housing member 52 is constructed with shoulder-like guide surfaces radially adjacent each bearing member to maintain alignment of the bearing members and their respective ports and enable limited axial bearing member movement.

The bearing members 120, 122 are preferably formed from ceramic material like the valving member 40. The bearing members 120, 122 are shaped and sized so that when the valving member 40 is in the position illustrated by FIG. 2, the valve port 85 is disposed against the bearing member sealing faces 124, 126 and away from alignment with either the third or fourth port. Accordingly none of the coolant flowing through the bypass passage formed by the recessed valving member face 82 can flow along the valve face 88 to either the third or the fourth port. Thus the valving member 40 and the bearing members 120, 122 positively prevent communication of the heater core 14 with the coolant delivered to the valve assembly 12 in the by-passing mode of the valve assembly.

While a single embodiment of the present invention has been illustrated and described herein in considerable detail, the present invention is not to be considered limited to the precise construction disclosed. Various adaptations, modifications and uses of the invention may occur to those skilled in the art to which the invention relates and the intention is to cover hereby all such adaptations, modifications and uses falling within the scope or spirit of the appended claims.

We claim:

1. An engine coolant flow controlling valve for governing the flow of engine coolant to a heat exchanger comprising:
   (a) a valve housing defining first and second ports for respectively introducing coolant to the valve housing from the engine and directing coolant to the engine from the housing, said first and second ports opening into said housing adjacent each other in a housing wall, and third and fourth ports for respectively directing coolant from the housing to the heat exchanger and introducing coolant from the heat exchanger to the housing;
   (b) a ceramic valving member supported for translational movement in said housing between a first position wherein coolant flows to said heat exchanger via said first and third ports and returns to the engine via said second and fourth ports and a second position wherein said valving member blocks flow through said third and fourth ports so that coolant flows from said first port to said second port bypassing said heat exchanger, said valving member having one side slidably engaging a valving member slide surface formed on said housing wall in sealing engagement therewith, said valving member movable along said slide surface between said positions;
   (c) valving member operator means extending into said housing for moving said valving member, and
   (d) valving member engaging means for resiliently maintaining said valving member in sealing engagement with said housing wall, said engaging means surrounding each of said third and fourth ports in sealing relationship with said housing and sealingly engaged with said valving member at least when said valving member is in said second position;
   (e) said valving member defining a recessed area within said one lateral side with a valve port opening through said valving member into said recessed area, said recessed area shaped to overlie said first and second ports when said valving member is in said second position, said valving member engaging means sealingly engaged with said valving member to prevent flow through said valve port to said third and fourth ports.

2. The valve claimed in claim 1 wherein said recessed area is surrounded by a continuous sealing land extending into sealing engagement with said valve slide surface, said sealing land extending about said first and second ports when said valving member is in said second position.

3. The valve claimed in claims 1 or 2 wherein said valving member engaging means comprises first and second pressure members respectively surrounding said third and fourth ports and biasing means for urging the pressure members towards engagement with the valving member, said pressure members sealingly engaging said valving member in its second position to prevent communication between said valve port and said third and fourth ports.

4. The valve claimed in claim 3 wherein said third and fourth ports are formed in a second housing wall opposite to said valving member slide surface, said slide surface having a valving member engaging portion adjacent one of said first and second ports and extending therefrom in a direction away from the other of said first and second ports, said valving member overlying said slide surface portion and said one of said first and second ports with said valve port substantially aligned with said one port when said valving member is in said first position.

5. The valve claimed in claim 1 wherein said housing is formed by first and second housing members attached together to form a chamber for said valving member, one of said housing members defining an integral outwardly extending mounting flange, said operator means comprising a support member fixed to said flange, a crank pivoted to said support member and an actuating rod connected to said crank and extending into said chamber, said rod connected to said valving member.

* * * * *